Patented June 20, 1933

1,914,563

UNITED STATES PATENT OFFICE

JOHN WATSON GILBERT, OF PARLIN, NEW JERSEY, ASSIGNOR TO E. I. DU PONT DE NEMOURS & COMPANY, OF WILMINGTON, DELAWARE, A CORPORATION OF DELAWARE

NONCHALKING COATING COMPOSITION

No Drawing.   Application filed January 3, 1929.   Serial No. 330,147.

This invention relates to paints or lacquers made from cellulose derivatives and more particularly to non-chalking paints containing antimony oxide.

Pyroxylin enamels in general, and particularly those containing considerable quantities of the commonly used white pigments, such as zinc oxide, lithopone, etc., have an inherent tendency to chalk upon exposure to the weather. This chalking is essentially a surface effect due to a very gradual, superficial disintegration of the protective film which releases the pigment particles. As the period of exposure progresses this chalking gradually increases until finally the film when exposed to the weather is almost completely destroyed due to washing away and erosion. Obviously, this effect is undesirable from several viewpoints. For example, chalk gives a dull, lifeless appearance to a finish such as that applied to an automobile and necessitates frequent washing and polishing to keep the finish in a satisfactory condition. Furthermore, the wearing or washing away of the chalk gradually decreases film thickness, eventually resulting not only in complete loss of protection but also in poor appearance.

I have found that all of the commonly used white pigments will chalk in a pyroxylin vehicle when exposed to the weather. Zinc oxide, which is probably the most widely used white pigment for lacquer, chalks considerably when used alone or in combination with other pigments. Titanox and pure titanium oxide, which are pigments resembling each other, show excessive chalking on exposure in pyroxylin vehicles. These pigments likewise chalk badly when exposed in paint or drying oil vehicles. Lithopone, another white pigment, is not durable on outdoor exposure in pyroxylin vehicles and is therefore not generally used in outside lacquers.

This invention has as an object to provide a new pigmented cellulosic paint or lacquer. Another object is to provide a paint capable of producing a coat or film which is not subject to chalking when exposed to the weather or other erosive conditions and which will effectively retain its original luster. Other objects will appear hereinafter.

These objects are accomplished by the following invention which comprises the incorporation of antimony oxide into a cellulose derivative vehicle.

The following examples, showing several of the preferred embodiments of my invention, are given for purposes of illustration, but are not to be regarded as limitations:

*Example 1*

|   | Per cent |
|---|---|
| Low viscosity nitrocellulose | 10 |
| Damar resin | 3 |
| Ester gum | -- |
| Castor oil | 3 |
| Dibutyl phthalate | 3 |
| Antimony oxide | 15 |
| Solvents and diluents | 66 |
|   | 100 |

*Example 2*

|   | Per cent |
|---|---|
| Low viscosity nitrocellulose | 10 |
| Damar resin | 5 |
| Ester gum | -- |
| Castor oil | 3 |
| Dibutyl phthalate | 3 |
| Antimony oxide | 15 |
| Solvents and diluents | 64 |
|   | 100 |

*Example 3*

|   | Per cent |
|---|---|
| Low viscosity nitrocellulose | 10 |
| Damar resin | 5 |
| Ester gum | -- |
| Castor oil | 3 |
| Dibutyl phthalate | 3 |
| Antimony oxide | 25 |
| Solvents and diluents | 54 |
|   | 100 |

*Example 4*

|   | Per cent |
|---|---|
| Low viscosity nitrocellulose | 10 |
| Damar resin | 2.5 |
| Ester gum | 2.5 |
| Castor oil | 3 |
| Dibutyl phthalate | 3 |
| Antimony oxide | 15 |
| Solvents and diluents | 64 |
|   | 100.0 |

The above examples do not include zinc oxide, titanium oxide or lithopone and the compositions coming within the scope of this invention are substantially free of the above commonly used pigments. It has been found that a film having appreciably improved resistance to chalking cannot be obtained according to the present invention where zinc oxide, titanium oxide or lithopone are present in appreciable amounts.

It is to be understood that I may make many modifications in the formulation of my improved coating composition within the scope of my invention.

For example, the incorporation of the antimony oxide into the vehicle may be accomplished by any of the accepted methods now in use in the paint, lacquer or allied industries, such as grinding in roller mills, buhr stone mills, pebble or ball mills, or in any other convenient manner.

Although I prefer to use a low viscosity pyroxylin, I may use pyroxylin of various types and viscosity characteristics. Furthermore, I may use other cellulose derivatives than pyroxylin, such as cellulose acetate, etc. It is obvious that the amount of cellulose derivative employed in making up any particular composition will depend on the type and viscosity of the product desired.

I may use either natural resins, such as rosin, shellac, elemi, damar gum, etc., or synthetic resins, such as cumarone, amberol, ester gum, or their equivalents.

Furthermore, I may use various types of oils. These may be either drying oils or non-drying oils, or both. Typical of the drying oils are linseed and chinawood oils, while among the non-drying oils may be mentioned castor oil, stearic acid, etc.

I may employ various plasticizing agents, such as dibutyl phthalate, tricresyl phosphate, triphenyl phosphate, etc., either alone or in varying combinations.

Again, the cellulose derivative may be dissolved in a variety of solvents or solvent combinations, either with or without the addition of diluents. It is, of course, obvious that the solvents and diluents selected will depend upon the type of cellulose derivative employed and also upon the desired characteristics of the coating composition.

It is also to be understood that the antimony oxide pigment may be used alone or in combination with various other pigments or coloring matter within the scope of my invention.

My improved non-chalking coating composition may be used as a protective or decorative coating for many objects which are intended for indoor use, such as refrigerators, furniture, toys, novelties, brush handles, etc. It finds particular application as a protective coating for surfaces exposed to severe weather conditions, such as the finish of automobiles, railroad cars, and other vehicles.

Heretofore, coating compositions consisting of cellulose derivatives, resins, oils, plasticizers, solvents and diluents would chalk and wear away badly on exposure when the ordinary pigments were employed in their formulation. For example, a film consisting of nitrocellulose, resin, oil, plasticizer, and zinc oxide will become chalked and completely worn away within a relatively short time, while a coating composition made according to my invention and containing antimony oxide as a pigment exhibits practically no chalk nor indication of erosion or wearing away after continued exposure for a period as long as three years.

This chalking effect characteristic of the ordinary types of film produced from present paints and lacquers soon gives rise to a loss of luster and consequent spoiling of appearance, but by the use of the coating material of my invention, a film may be produced which will retain its luster indefinitely. Ordinary films require frequent cleaning and polishing to retain a satisfactory appearance, but with a film produced from the composition above described, this labor is reduced to a minimum. It will thus be apparent that I have produced a very effective, resistant, non-chalking coating composition.

As many apparently widely different embodiments of this invention may be made without departing from the spirit and scope thereof, it is to be understood that I do not limit myself to the specific embodiments thereof except as defined in the appended claims.

I claim:

1. A coating composition adapted to give films resistant to chalking consisting of low viscosity cellulose nitrate, damar resin, ester gum, castor oil, dibutyl phthalate, antimony oxide, solvents and diluents.

2. A coating composition adapted to give films resistant to chalking comprising a cellulose derivative vehicle and antimony oxide, said cellulose derivative vehicle being of the type which is adapted to give chalking films with zinc oxide, titanium oxide or lithopone and said coating composition being substantially free of the pigments, zinc oxide, titanium oxide and lithopone.

3. A coating composition adapted to give films resistant to chalking comprising a cellulose nitrate vehicle and antimony oxide, said cellulose nitrate vehicle being of the type which is adapted to give chalking films with zinc oxide, titanium oxide or lithopone and said coating composition being substantially free of the pigments, zinc oxide, titanium oxide and lithopone.

In testimony whereof, I affix my signature.

JOHN W. GILBERT.